(12) United States Patent
Tofukuji et al.

(10) Patent No.: US 8,423,219 B2
(45) Date of Patent: Apr. 16, 2013

(54) ELECTRIC DRIVE VEHICLE

(75) Inventors: Satoko Tofukuji, Susono (JP); Atsunori Kumagai, Sunto-gun (JP); Hiroki Murata, Gotenba (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 154 days.

(21) Appl. No.: 13/002,270

(22) PCT Filed: Mar. 18, 2010

(86) PCT No.: PCT/JP2010/054667
§ 371 (c)(1),
(2), (4) Date: Dec. 30, 2010

(87) PCT Pub. No.: WO2011/114486
PCT Pub. Date: Sep. 22, 2011

(65) Prior Publication Data
US 2011/0276206 A1 Nov. 10, 2011

(51) Int. Cl.
*B60L 15/00* (2006.01)
*B60W 20/00* (2006.01)

(52) U.S. Cl.
USPC ........ 701/22; 701/31.4; 180/65.25; 180/65.8; 180/65.29; 180/65.245; 180/65.285; 320/104; 320/109; 320/128; 320/134

(58) Field of Classification Search .................... 701/22, 701/31.4; 180/65, 65.245, 65.25, 65.8, 65.29, 180/65.285; 903/903; 320/104, 109, 128, 320/134
See application file for complete search history.

(56) References Cited

U.S. PATENT DOCUMENTS

| 6,814,170 | B2* | 11/2004 | Abe et al. ............... 180/65.25 |
| 7,688,023 | B2* | 3/2010 | Yoon et al. ................... 320/104 |
| 7,768,384 | B2* | 8/2010 | Yamaguchi ................ 340/455 |
| 2006/0255766 | A1* | 11/2006 | Yoon et al. ................... 320/128 |
| 2009/0259354 | A1* | 10/2009 | Krupadanam et al. .......... 701/22 |

(Continued)

FOREIGN PATENT DOCUMENTS

| JP | 07-231505 A | 8/1995 |
| JP | 10-150701 A | 6/1998 |

(Continued)

OTHER PUBLICATIONS

Japanese Office Action dated Nov. 15, 2011, issued in corresponding Japanese Patent Application No. 2010-549970.

*Primary Examiner* — Thomas Black
*Assistant Examiner* — Wae Louie
(74) *Attorney, Agent, or Firm* — Sughrue Mion, PLLC

(57) ABSTRACT

An electric drive vehicle includes a vehicle main body 10, a battery 12, a power generating unit 11 that charges to the battery 12, an operating condition setting switch 40 capable of setting an operating condition of the power generating unit 11, a power-generating-unit side ECU 113 that operates the power generating unit 11 on the basis of the operating condition, a navigation system 30 that acquires a vehicle traveling condition, and a vehicle-side ECU 50 that estimates the amount of charge consumed in the battery 12 during traveling under the vehicle traveling condition. The vehicle-side ECU 50 turns on an alarm lump 46 when an estimated time necessary for charging the battery to make up the amount of charge estimated is longer than a desired time it takes to charge the battery to make up the amount of charge estimated.

4 Claims, 6 Drawing Sheets

U.S. PATENT DOCUMENTS

| | | | |
|---|---|---|---|
| 2010/0006356 A1* | 1/2010 | Curry et al. | 180/65.8 |
| 2010/0151918 A1* | 6/2010 | Annambhotla et al. | 455/573 |
| 2010/0241301 A1* | 9/2010 | Yang | 701/29 |
| 2011/0089953 A1* | 4/2011 | Chandler et al. | 324/427 |
| 2011/0128007 A1* | 6/2011 | Nishidai et al. | 324/427 |
| 2011/0163722 A1* | 7/2011 | Gale et al. | 320/134 |
| 2011/0169448 A1* | 7/2011 | Ichikawa | 320/109 |
| 2011/0202210 A1* | 8/2011 | Goda | 701/22 |
| 2011/0221392 A1* | 9/2011 | Gale et al. | 320/109 |
| 2011/0254692 A1* | 10/2011 | Furuta | 340/636.1 |
| 2011/0276206 A1* | 11/2011 | Tofukuji et al. | 701/22 |

FOREIGN PATENT DOCUMENTS

| | | |
|---|---|---|
| JP | 2001-211504 A | 8/2001 |
| JP | 2006-112932 A | 4/2006 |
| JP | 2006-141156 A | 6/2006 |
| JP | 2008-278740 A | 11/2008 |
| JP | 2008-309544 A | 12/2008 |
| JP | 2009-025128 A | 2/2009 |
| JP | 2010-032459 A | 2/2010 |
| WO | 2005/068245 A1 | 7/2005 |

\* cited by examiner

ELECTRIC DRIVE VEHICLE

CROSS REFERENCE TO RELATED APPLICATIONS

This application is a National Stage of International Application No. PCT/JP2010/054667 filed Mar. 18, 2010, the content of which is incorporated herein by reference in its entirety.

TECHNICAL FIELD

The present invention relates to electric drive vehicles, and more particularly, to an electric drive vehicle in which a power generating unit that charges a battery usable for traveling is installed.

BACKGROUND ART

Conventionally, there is known an electric drive vehicle equipped with a battery usable for traveling. Such an electric drive vehicle has a limited travelable distance that depends on the state of charge of the battery. Thus, there is known an electric drive vehicle equipped further with a power generating unit that charges the battery.

As to the electric drive vehicle equipped with the power generating unit, there is disclosed an art that may be related to the invention in terms of controlling the amount of generation that depends on a traveling pattern in, for example, Patent Document 1. There is disclosed an art that may be related to the invention in terms of controlling charge and discharge while predicting a traveling condition of the vehicle in, for example, patent Document 2. There is disclosed an art that may be related to the present invention in terms of detachably installing a power generating unit or a battery for discharge while considering whether to travel around locally or travel a long way in, for example, Patent Document 3.

Prior Art Documents
Patent Documents
    Patent Document 1: Japanese Patent Application Publication No. 07-231505
    Patent Document 2: Japanese Patent Application Publication No. 10-150701
    Patent Document 3: Japanese Patent Application Publication No. 2001-211504

SUMMARY OF THE INVENTION

Problems to be Solved by the Invention

In the electric drive vehicle equipped with the power generating unit, it is possible to ensure power necessary for arriving at a destination by power generation by the power generating unit in addition to the power already stored in the battery. However, even when power necessary for arriving at the destination can be ensured by power generation by the power generating unit, if the power generating unit cannot complete generation of necessary power within the time by which the vehicle arrives at the destination, the vehicle will fall in inability to run. In this regard, an operating condition such as an operating condition having priority given to fuel economy or an operating condition having priority given to output may be set in operation of the power generating unit. In this case, even when necessary power can be ensured only by power generation of the power generating unit, the battery may not be satisfactorily charged by the power generating unit under a certain operating condition of the power generating unit besides the traveling condition of the vehicle. Thus, there is a problem in that the vehicle may fall in inability to run.

The present invention has been made in terms of the above-described problems and aims at providing an electric drive vehicle that enables a power generating unit to operate under a given condition and makes it possible to prevent the vehicle from falling in inability to run due to shortage of charge before it happens in a case where the vehicle travels under a predetermined vehicle traveling condition.

Means for Solving the Problems

The present invention that intends to solve the above problems is an electric drive vehicle including: a vehicle main body; and a battery mounted on the vehicle main body and usable for traveling; and a power generating unit that charges to the battery, further including: operating condition setting means capable of setting an operating condition of the power generating unit; operation means for operating the power generating unit under the operating condition; vehicle traveling condition acquiring means for acquiring a vehicle traveling condition; estimation means for estimating, from the vehicle traveling condition, an amount of charge of the battery consumed in traveling under the vehicle traveling condition; estimated time calculating means for calculating an estimated time necessary for charging the battery to make up the amount of charge estimated by the estimation means under the traveling condition by the power generating unit; desired time setting means for setting a desired time it takes to charge the battery to make up the amount of charge estimated by the estimation means under the traveling condition by the power generating unit; and first notification control means for performing a control to notify a driver of an alarm when the estimated time is longer than the desired time.

The present may be preferably configured to include: estimated amount-of-fuel calculating means for calculated an estimated amount of fuel needed to travel under the vehicle traveling condition; and second notification control means for performing a control to notify the driver of the estimated amount of fuel.

The present invention may be configured to further include: vehicle utilizing condition grasping means for grasping a vehicle utilizing condition; travelable distance calculating means for calculating a travelable distance taking the vehicle utilizing condition into consideration; and third notification control means for performing a control to notify the driver of the estimated travelable distance.

Effects of the Invention

According to the present invention, it is possible to prevent the vehicle from falling in inability to run due to shortage of charge before it happens in a case where the vehicle travels under the predetermined vehicle traveling condition while operating the power generating unit to operate under the given condition.

EMBODIMENTS FOR CARRYING OUT THE INVENTION

A description will now be given, with reference to the accompanying drawings, of embodiments for carrying out the invention.

Figure 1:
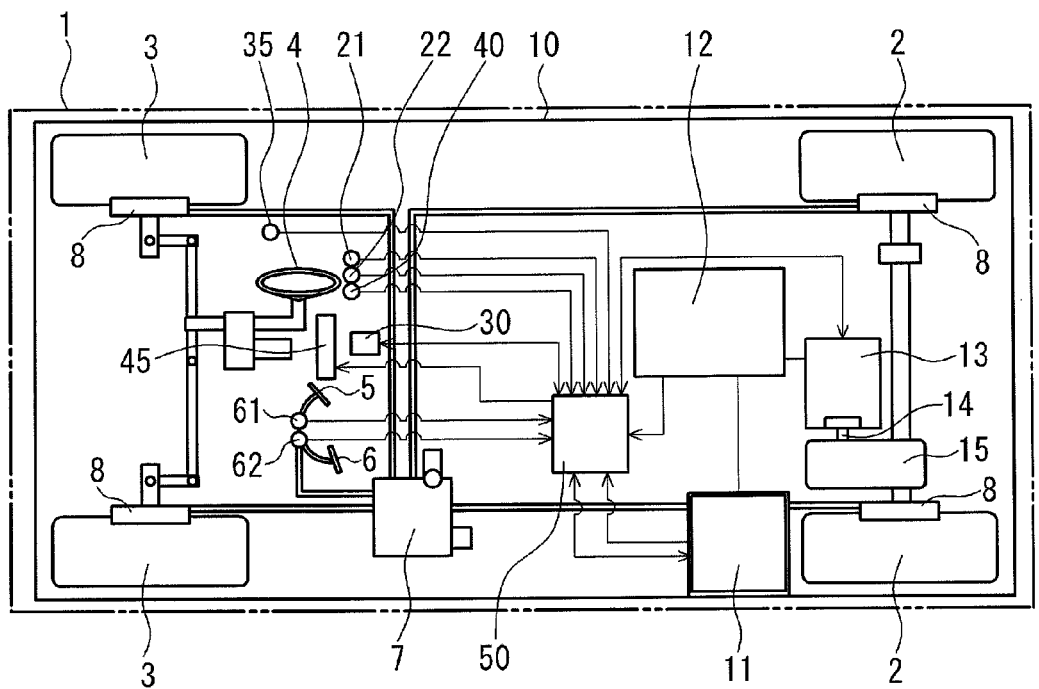
FIG. 1 is a schematic diagram of a structure of an electric drive vehicle.
Figure 2:
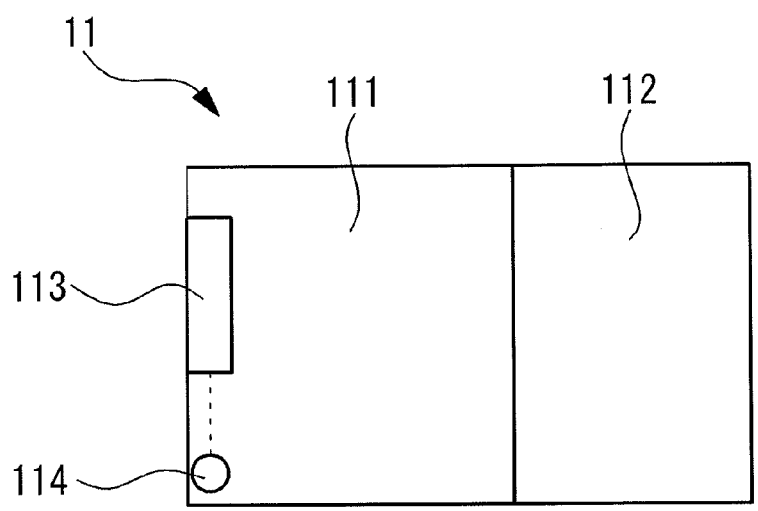
FIG. 2 is a diagram that illustrates a power generating unit in detail.
Figure 3:
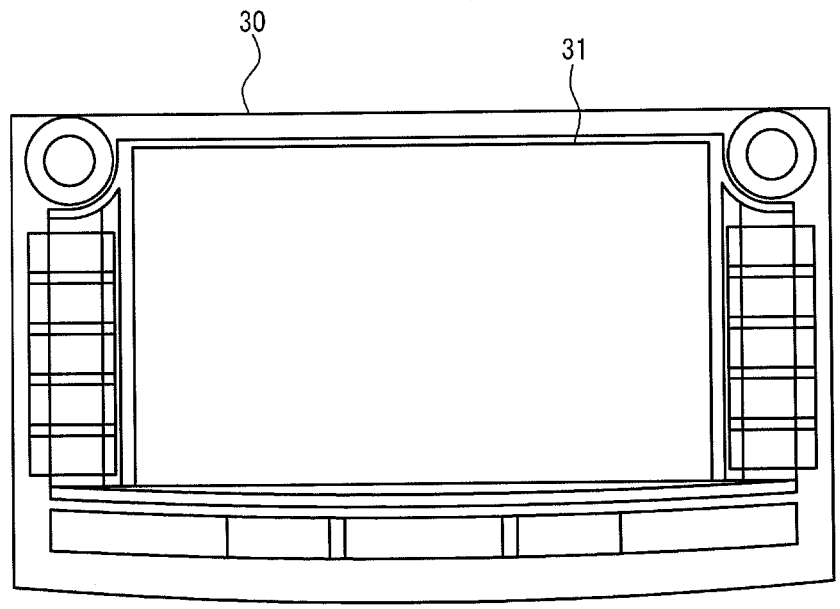
FIG. 3 is a diagram that illustrates a navigation system in detail.

As illustrated in FIG. 1, an electric drive vehicle 1 has a vehicle main body 10 on which a power generating unit 11, a battery 12 and an electric motor 13 are mounted. The power generating unit 11 is detachably installed in the electric drive vehicle 1. The electric drive vehicle 1 with the power generating unit 11 being installed detachably is capable of driving even in a state in which the power generating unit 11 is not installed and an electric connection with the power generating unit 11 is not made.

The power generating unit 11 is of an engine driven type, and is equipped with an engine 111, a generator 112 and a power generating unit side ECU 113. The engine 111 drives the generator 112, which generates alternating current. The alternating current thus generated is converted to direct current by a not-illustrated rectifier circuit before being stored in the battery 12. The ECU 113A on the power generating unit side is provided for primarily controlling the engine 111. A fuel sensor 114 for sensing the amount of remaining fuel of the power generating unit is electrically connected to the ECU 113 on the power generating unit side.

As illustrated in FIG. 1, the battery 12 is a DC battery, and is electrically and detachably connected to the power generating unit 11 via a high-voltage-system wiring, which is a power wiring. Power generated by the power generating unit 11 is stored in the battery 12 via the high-voltage-system wiring. The battery 12 may be composed of multiple batteries having a rated voltage of 12 V connected in series. The electric motor 12 is a driving source and is a DC motor. The electric motor 13 is supplied with power from the battery 12 and rotates an output shaft 14. The rotary output is transmitted, via a transmission 15, to a pair of right and left rear wheels 2, which are driving wheels, so that the rear wheels 2 can be driven. As described above, the electric drive vehicle 1A is of a series hybrid type.

The electric drive vehicle 1A is equipped, in addition to the pair of right and left rear wheels 2 of the driving wheels, with a pair of right and left front wheels 3 that are steering wheels, a handle 4 for manually steering the front wheels 3, an acceleration pedal 5 for changing the number of revolutions of the electric motor 13, a brake pedal 6 and a brake unit 7 for braking the vehicle, and drum brakes 8, which are coupled with the brake pedal 6 by wires, joined to the brake unit 7 and are provided to the front wheels 2 and the rear wheels 3. The acceleration pedal 5 is provided with an acceleration position sensor 25 that senses the amount of depression of the acceleration pedal 5, and the brake pedal 6 is provided with a brake switch 26 that senses whether the brake pedal 6 is depressed or not.

The electric drive vehicle 1A is further provided with a key switch 21. The key switch 21 enables selective switching operation between ON, OFF and ACC. The key switch 21 is an operation means configured to issue an operation request to the power generating unit 11 and the electric motor 13. More particularly, when the key switch 21 is ON, the operation request is enabled. When the key switch 21 is OFF, the operation request is disabled. When the key switch 21 is ACC, an electric system is activated. When the key switch 21 is then switched to ON, the activated state is maintained. Besides the key switch 21, the electric drive vehicle 1 is equipped with a generation stop switch 22, which is an operation means capable of stopping the operation of the power generating unit 11. Instead of the generation stop switch 22, an operation means for issuing an operation request to the power generating unit 11 may be provided separately from the key switch 21.

Further, the electric drive vehicle 1 is equipped with a navigation system 30. The navigation system 30 is an in-vehicle electronic device capable of displaying the current location of the vehicle. The navigation system 30 is equipped with a touch panel 3, which is used to display various items of information and is an operation means for realizing various operations.

The navigation system 30 utilizes a GPS (Global Positioning System), detects the current location of the vehicle by map matching, and causes the detected current location of the vehicle to be displayed on the touch panel 31 together with a peripheral map. In the map matching and map displaying, the navigation system 30 may utilize map information stored in a large-capacity storage medium such as a DVD-ROM.

The navigation system 30 utilizes VICS (Vehicle Information and Communication System) to obtain road traffic information about a traffic jam and a traffic regulation, and causes it to be displayed on the touch panel 31.

The navigation system 30 is capable of setting a destination by a given operation using the touch panel 31. The navigation system 30 in which the destination has been set creates a route for traveling to the destination and causes the traveling route to be displayed on the touch panel 31 so as to be overlaid on the map.

The navigation system 30 may employ notification of information by voice using a speaker 35 instead of or together with the display on the touch panel 31.

Figure 4:
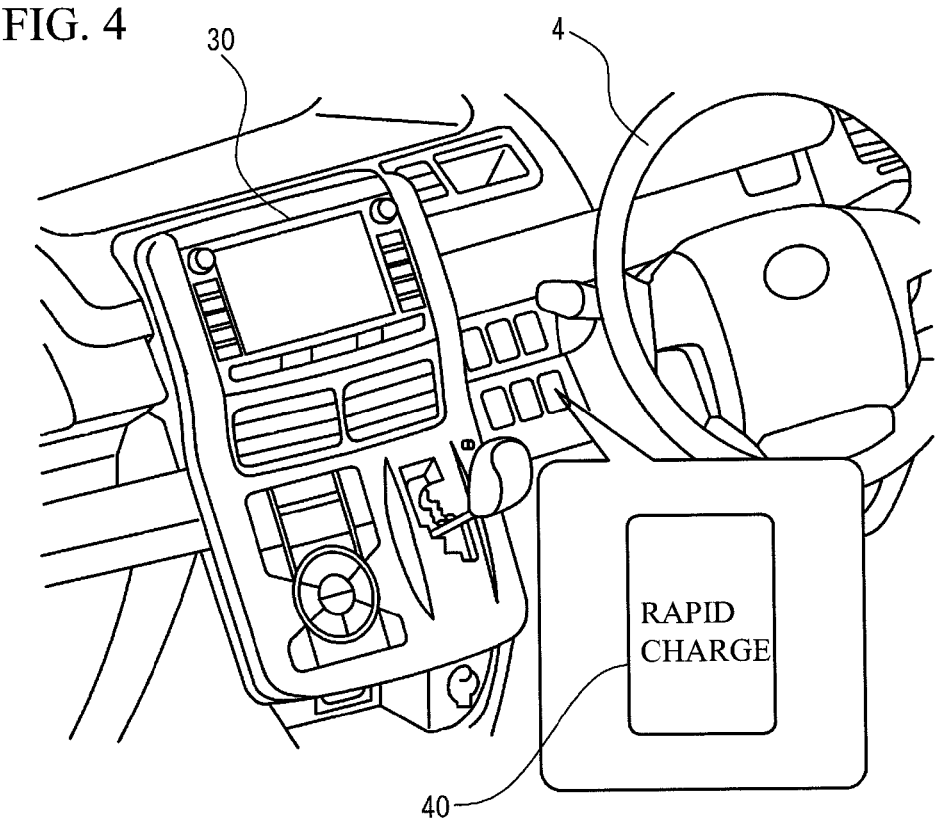
FIG. 4 is a diagram that illustrates an operating condition setting switch in detail.

The electric drive vehicle 1 is equipped with an operating condition setting switch 40 used to set the operating condition of the power generating unit 11. More specifically, the operating condition setting switch 40 may be a switch that changes the operating condition of the power generating unit 11 between an eco-charge mode in which the power generating unit 11 is operated with priority being given to fuel economy and a rapid-charge mode in which the power generating unit 11 is operated with priority being given to output. In this regard, the power generating unit 11 is operated at an optimal operating point in view of fuel economy in the eco-charge mode, and is operated at an operating point at which the maximum output is available. As illustrated in FIG. 4, the operating condition setting switch 40 is configured to set the operating condition of the power generating unit 11 to the rapid-charge mode. By turning off the operating condition setting switch 40, the operating condition of the power generating unit 11 is set to the eco-charge mode.

Figure 5:
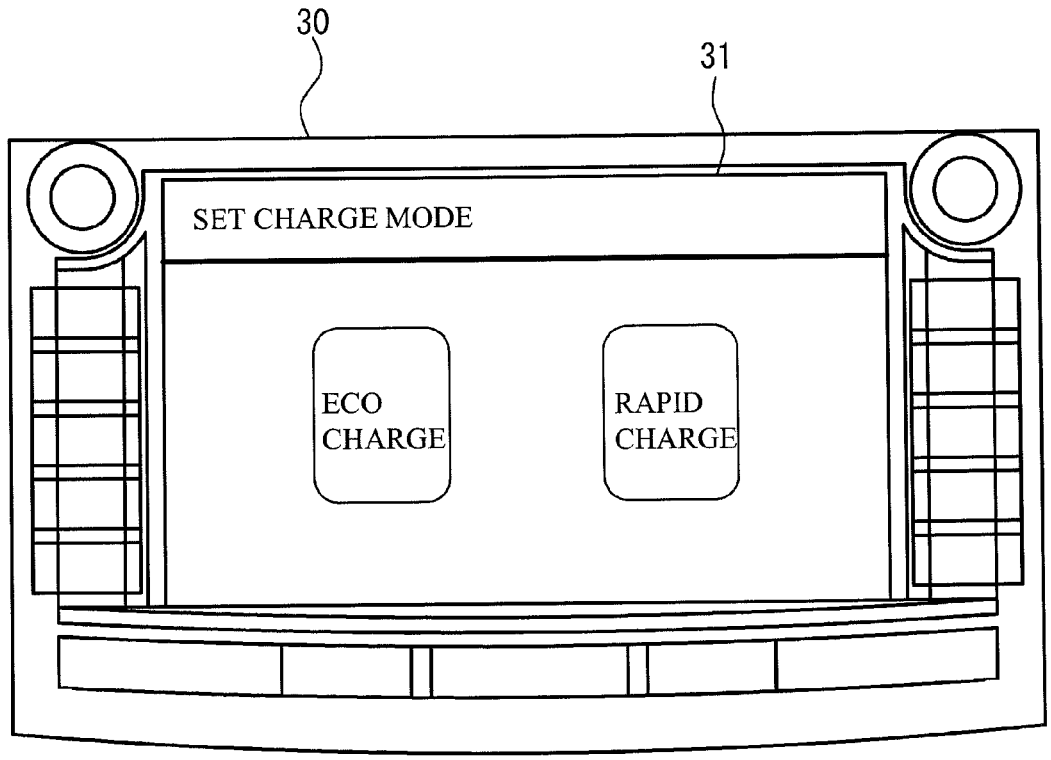
FIG. 5 is a diagram that illustrates operating condition setting means realized by a touch panel.

The operating condition of the power generating unit 11 is not limited to the eco-charge mode and the rapid-charge mode, but another operating condition such that fuel economy and output are balanced may be applied to the operating condition of the power generating unit 11. Instead of the operating condition setting switch 40, means for setting the operating condition may be realized by, for example, a touch panel 51 as illustrated in FIG. 5.

The operating condition setting switch 40 is not only means for setting the operating condition of the power generating unit 11 but also means for setting a user's intention involved in the operation of the power generating unit 11.

Figure 6:
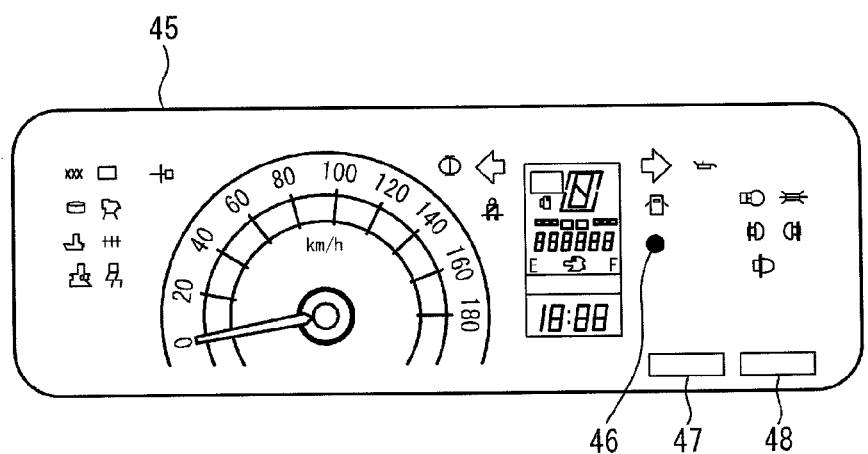
FIG. 6 is a diagram that illustrates an instrument panel in detail.

Further, the electric drive vehicle 1 is equipped with an instrument panel 45. As illustrated in FIG. 6, on the instrument panel 45, there are provided an alarm lamp 46 for a given alarm, an amount-of-fuel display part 47 as means for showing an estimated amount of fuel for the power generating unit 11 necessary for traveling the route for the destination, and a travelable distance display part 48 as means for showing an estimated travelable distance.

Further, the electric drive vehicle 1 is equipped with a vehicle-side ECU 50, which is a first control device. The ECU 50 on the vehicle side has a microcomputer composed of a CPU, a ROM, a RAM and so on, and an input/output circuit, which are not illustrated. The ECU 113 on the power generating unit side, which corresponds to a second control device, is configured similarly. The power generating unit 11 (more particularly, the ECU 113 on the power generating unit side) is connected electrically and detachably to the ECU 50 on the vehicle side. In this regard, the ECU 50 on the vehicle side and the power generating unit 11 are connected by a low-voltage-system wiring, which is a control-system wiring.

To the ECU 50 on the vehicle side, there are connected the electric motor 13, the speaker 35, the instrument panel 45 (more particularly, the alarm lamp 46, the amount-of-fuel display part 47 and the travelable distance display part 48), various controlled objects such as an air conditioner, and various sensor and switches such as the key switch 21, the generation stop switch 22, the operating condition setting switch 40, an acceleration position sensor 61, and a brake switch 62. The navigation system 30 is connected to the ECU 50 on the vehicle side to communicate therewith. In this regard, the navigation system 30 is composed of a microcomputer including a CPU, a ROM, a RAM and so on, and an input/output circuit, which are not illustrated.

The ROM stores a program in which various processes executed by the CPU are described, and map data. The CPU executes the processes based on the program stored in the ROM while utilizing a temporary memory area formed in the RAM as necessary, and functionally realizes various control means, decision making means, detection means and calculating means in the navigation system 30, the ECU 50 on the vehicle side and the ECU 113 on the power generating unit side.

As to the above, for example, vehicle traveling condition acquiring means for acquiring a vehicle traveling condition is functionally realized in the navigation system 30.

The vehicle traveling condition is a traveling condition that influences consumption of the charge stored in the battery 12, and may include at least a travel distance, which is an expected travel distance. The vehicle traveling condition may include road information, road traffic information such as a traffic jam, section information, and altitude information. The road information may be composed of type of road such as expressway or ordinary road, the width of road, the number of lanes, and the speed limit. The section information may be composed of information as to whether the section of interest is a section in which the vehicle is frequently stopped at a read light such as an urban area or a section in which the vehicle is not frequently stopped such as a country area, and information as to whether the section of interest is a mountain area having many up and down slopes. The altitude information may include the altitudes and slopes of the roads in given positions.

As to the above, as the vehicle traveling condition includes more contents, there is a trend to make it possible to more precisely estimate or calculate the quantity of consumption of the charge stored in the battery 12 during traveling under the vehicle traveling condition, the estimated quantity of fuel, and the estimated travelable distance.

Figure 7:
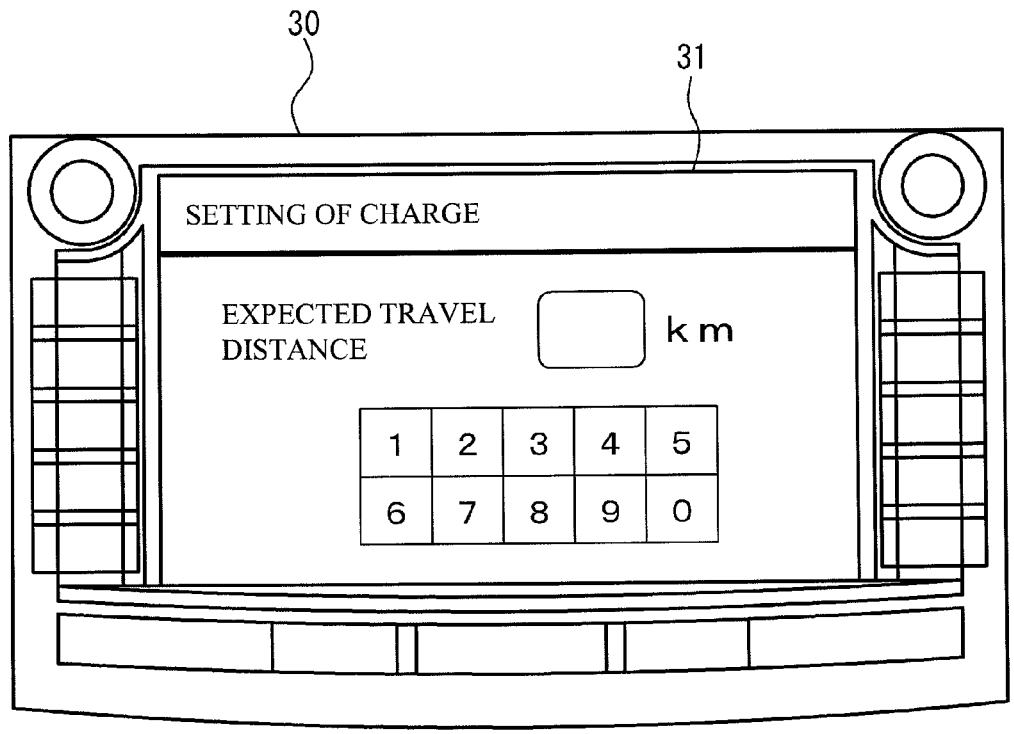
FIG. 7 is a diagram that illustrates vehicle traveling condition acquiring means realized by the touch panel.

The vehicle traveling condition acquiring means is realized so as to acquire various vehicle traveling conditions by using map information and VICS. However, the vehicle traveling condition acquiring means is not limited to the above but may be realized by the touch panel 31 (see FIG. 7) configured to have a screen through which the expected travel distance may be input.

In the ECU 50 on the vehicle side, there is functionally realized estimation means for estimating the amount of charge in the battery 12 consumed during traveling under the vehicle traveling condition acquired by the vehicle traveling condition acquiring means.

In the ECU 50 on the vehicle side, data about traveling patterns (in other words, the amount of battery consumption) estimated based on the various vehicle traveling conditions are experimentally obtained and are stored in the ROM. More particularly, the estimation means is realized so as to estimate the amount of charge in the battery 12 consumed on the basis of vehicle traveling patterns supposed under the various vehicle traveling conditions.

In case where the vehicle traveling condition is the travel distance only, the estimation means may be realized so as to estimate the amount of charge in the battery 12 consumed by referring to the average amounts of battery consumption (for example, the average amount of battery consumption per 1 km) respectively associated with given traveling patterns predetermined in, for example, standards.

In the ECU 50 on the vehicle side, there is functionally realized an estimated time calculating means for calculating an estimated time necessary for charging the battery 12 to make up the amount of charge estimated by the estimation means when the power generating unit 11 charges the battery 12 on the basis of the operating condition set by the operating condition setting switch 40. In this regard, the amounts of power generations per unit time respectively associated with the operating conditions of the power generating unit 11 are stored in the ROM of the ECU 50 on the vehicle side.

Figure 8:
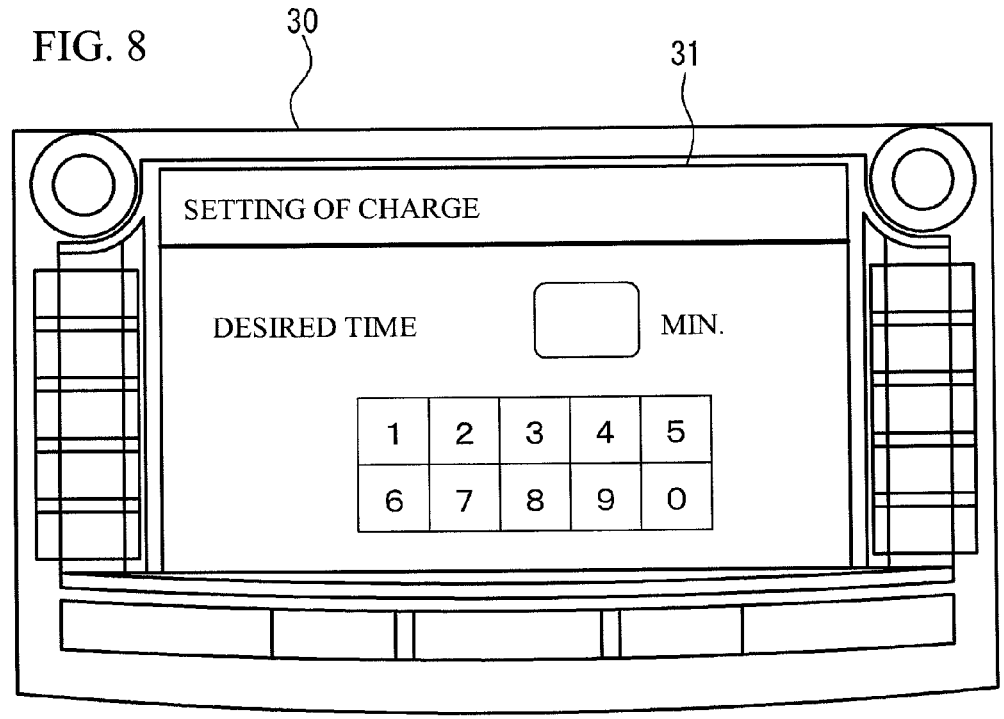
FIG. 8 is a diagram that illustrates desired time setting means realized by the touch panel.

In the navigation system 30, there is realized desired time setting means for setting a desired time it takes to charge the battery 12 to make up the amount of charge estimated by the estimation means is obtained when the power generating unit 11 charges the battery 12 on the basis of the operating condition set by the operating condition setting switch 40. More particularly, the desired time setting means may be realized by the touch panel (see FIG. 8) configured to have a screen on which the desired time may be input.

It is possible to set, as the desired time, an arbitrary time at which it is intended to complete the power generation and to set an expected time for traveling to the destination as the travel time corresponding to the travel distance, In a case where the expected time for traveling to the destination is used as the desired time, travel time calculating means capable of calculating the travel time for the destination may be functionally realized by the navigation system 30, and desired time setting means for automatically setting the travel time calculated by the travel time calculating means may be functionally realized.

In the ECU 50 on the vehicle side, there is functionally realized first notification control means for performing a control to notify the driver of an alarm when the estimated time calculated by the estimated time calculating means is longer than the desired time set by the desired time setting means. In this regard, the control to notify the driver of the alarm may be realized so that the first notification control means turns on the alarm lamp 46. The control to notify the driver of an alarm is not limited to the above but may be, for example, a control so that the first notification control means causes an alarm to be displayed on the touch panel 31, another control to output an alarm by voice through the speaker 35, or a combination of these controls.

In the ECU 50 on the vehicle side, there is functionally realized an estimated-amount-of-fuel calculating means for calculating an estimated amount of fuel for the power generating unit 11 necessary to travel under the vehicle traveling condition acquired by the vehicle traveling condition acquiring means. More particularly, the estimated-amount-of-fuel calculating means is realized so as to calculate the amount of fuel necessary for charging the battery 12 to make up the amount of charge estimated by the estimation means when the battery 12 is charged by the power generating unit 11 under the operating condition set by the operating condition setting switch 40. In this regard, the ROM of the ECU 50 on the vehicle side stores correlations between the amounts of power generation and the amounts of fuel consumption in association with the various operating conditions of the power generating unit 11 (which are the echo-charge mode and the rapid-charge mode in the present embodiment).

A second notification control means for carrying out a control for notification of an estimated amount of fuel is functionally realized in the ECU 50 on the vehicle side. More particularly, the second notification control means may be realized so that the estimated amount of fuel is displayed on the amount-of-fuel display part 47. However, the second notification control means is not limited to the above but may be, for example, a control so that the first notification control means causes the estimated amount of fuel to be displayed on the touch panel 31, another control for outputting the estimated amount of fuel by voice through the speaker 35, or a combination of these controls.

An estimated travelable distance calculating means for calculating an estimated travelable distance is functionally realized in the ECU 50 on the vehicle side. More particularly, the estimated travelable distance calculating means calculates an available total power on the basis of the state of charge of the battery 12, the amount of remaining fuel for the power generating unit 11, and the operating condition of the power generating unit 11 set by the operating condition setting switch 40, and calculates the average amount of battery consumption (for example, the average amount of battery consumption per 1 km) depending on the vehicle traveling condition on the basis of the vehicle traveling condition acquired by the vehicle traveling condition acquiring means. Further, the estimated travelable distance calculating means divides the total power by the average amount of battery consumption to thus obtain the estimated travelable distance.

A third notification control means for carrying out a control to notify the driver of the estimated travelable distance is functionally realized in the ECU 50 on the vehicle side. More particularly, the third notification control means is realized so as to carry out a control to cause the estimated travelable distance to be displayed. The third notification control means is not limited to the above but may be, for example, a control so that the third notification control means causes the estimated travelable distance to be displayed on the touch panel 31, another control to output the estimated travelable distance by voice through the speaker 35, or a combination of these controls.

A vehicle utilizing condition grasping means for grasping a vehicle utilizing condition is functionally realized in the ECU 50 on the vehicle side. The vehicle utilizing condition may include a utilizing condition that influences the state of charge of the battery 12 consumed during traveling under the vehicle traveling condition, and may include, for example, the status of utilization of an electric component that consumes power of the battery 12 such as an air conditioner, and may include a loaded weight. The loaded weight may be grasped from the product of the number of passengers obtained from an output signal of a seating sensor capable of sensing existence or nonexistence of passengers and the average weight, or may be grasped from an output of an air pressure sensor of tires. The loaded weight may be grasped by an input operation on the touch panel 31 configured to have an input screen on which the loaded weight can be input.

In the ECU 50 on the vehicle side, the estimation means is realized so as to estimate the amount of charge in the battery 12 consumed when the vehicle travels on the route for the destination by further considering the vehicle utilizing condition grasped by the vehicle utilizing condition grasping means. Similarly, the estimated travelable distance calculating means is realized so as to calculate the estimated travelable distance by further considering the vehicle utilizing condition grasped by the vehicle utilizing condition grasping means.

The vehicle utilizing condition may be considered by multiply the amount of battery consumption by a coefficient having a value that is predetermined in accordance with the degree of promotion of battery consumption.

The estimated-amount-of-fuel calculating means is consequently realized so as to consider the vehicle utilizing condition since the estimation means considers the vehicle utilizing condition.

An operation means for operating the power generating unit 11 under the operating condition set by the operating condition setting switch 40 is functionally realized in the ECU 113 on the power generating unit side. In this regard, the output of the operating condition setting switch 40 is arranged to be applied to the ECU 113 on the power generating unit side via the ECU 50 on the vehicle side. The ECU 113 on the power generating unit side is configured to determine whether the operating condition of the power generating unit 11 is in the eco-charge mode or the rapid-charge mode by referring to the output of the operating condition setting switch 40. The operation means corresponds to not only the above but also operation means for operating the power generating unit 11 on the basis of a user's intention set by the intention setting means.

Figure 9:
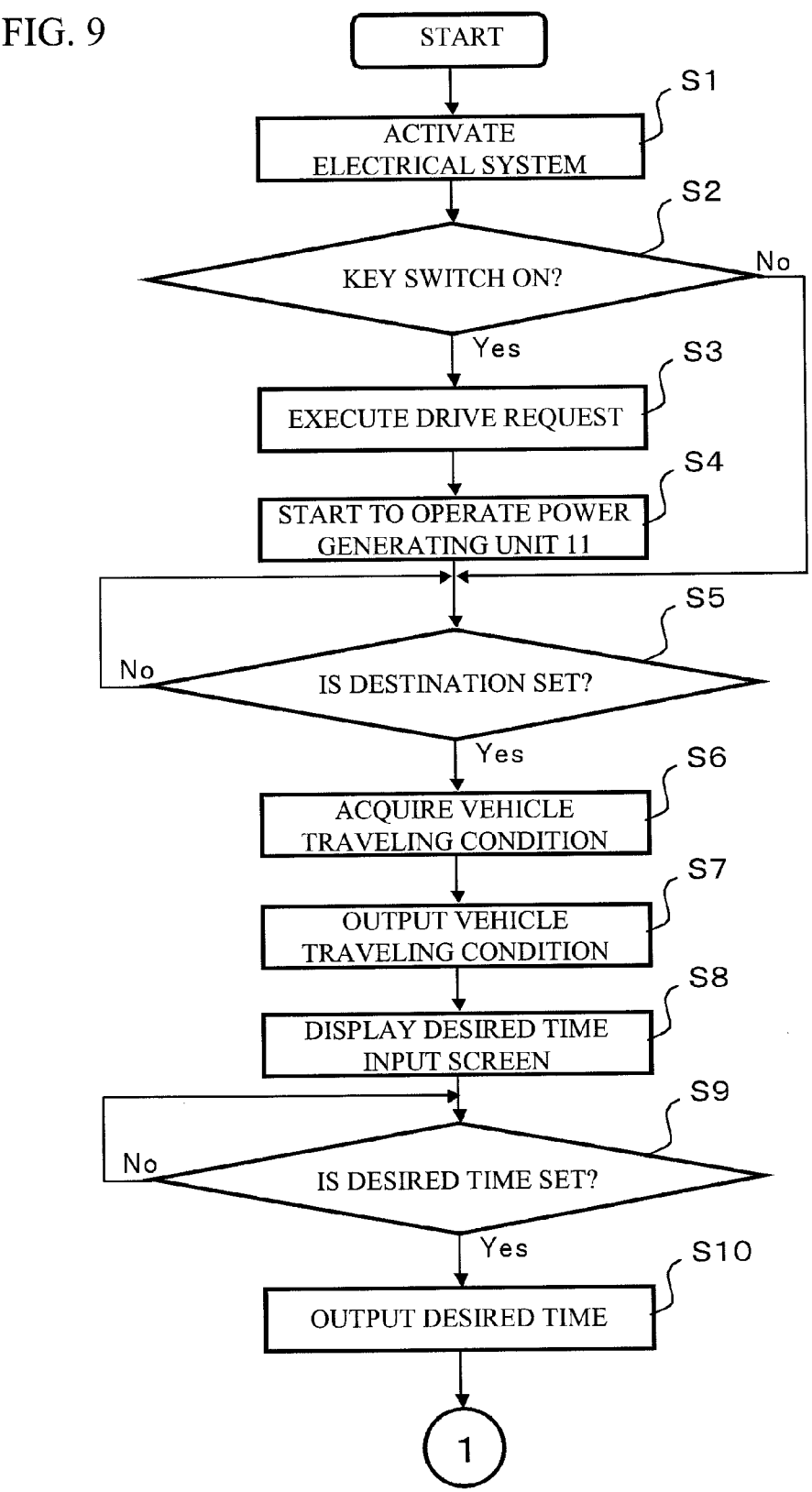
FIG. 9 is a flowchart of a control in the electric drive vehicle.
Figure 10:
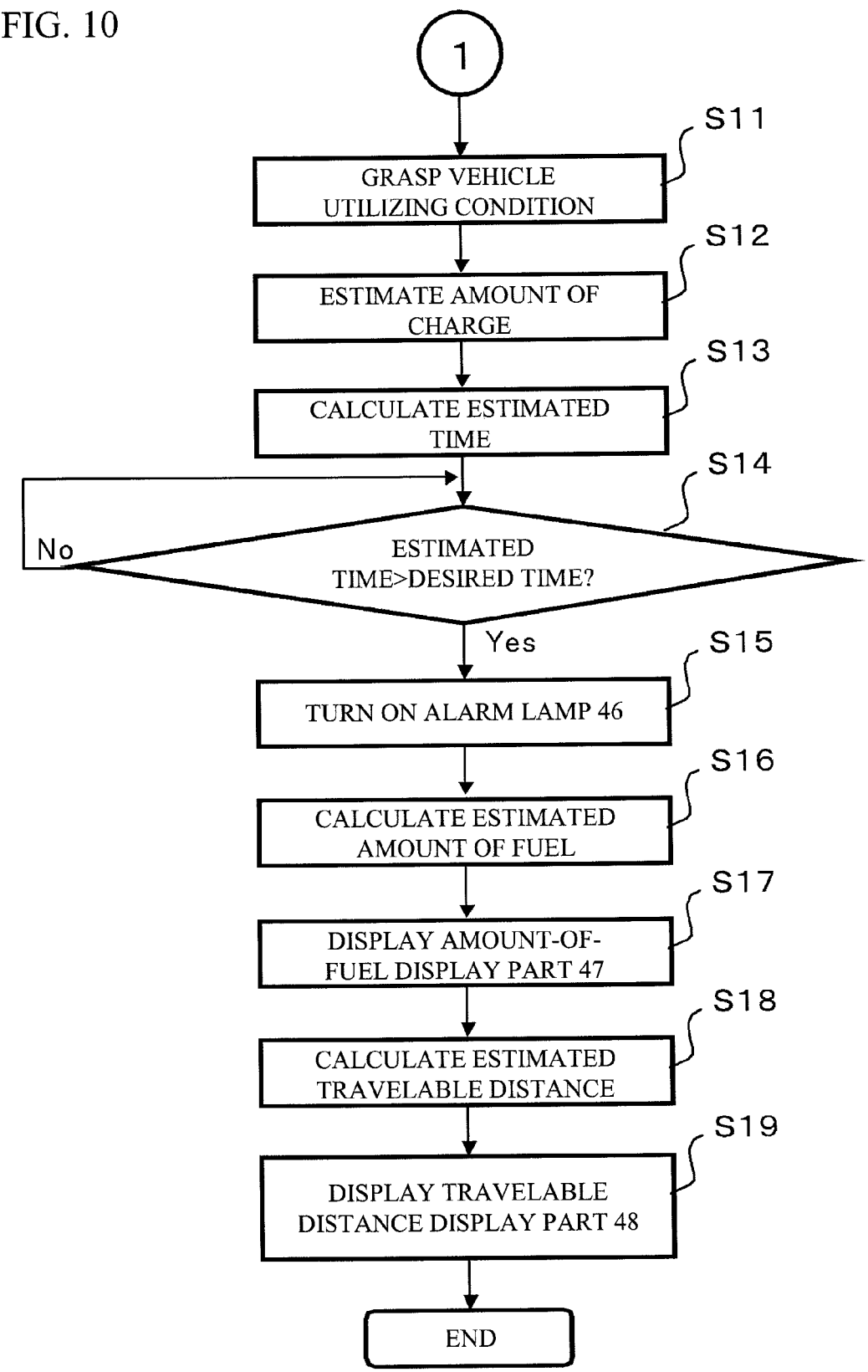
FIG. 10 is a flowchart of another control in the electric drive vehicle.

A description is now given, with reference to flowcharts of FIGS. 9 and 10, of a control in the electric drive vehicle 1. When the key switch 21 is at an ACC position, the electrical system is activated (step S1). More particularly, at this time, the navigation system 30, the ECU 50 on the vehicle side, and the ECU 113 on the power generating unit side are activated. Next, the ECU 50 on the vehicle side determines whether the key switch 21 is ON (step S2). When the answer is YES, the ECU 50 on the vehicle side issues an operation request for the power generating unit 11 and the electric motor 13 (step S3). Then, the ECU 113 on the power generating unit side starts to operate the power generating unit 11 (step S4). More particularly, at this step, the power generating unit 11 operates in the eco-charge mode or the rapid-charge mode in accordance with the output of the operating condition setting switch 40.

Subsequent to the negative determination in step S2 or step S4, the navigation system 30 determines whether a destination is set (step S5). When the answer is NO, the process returns to step S5. In contrast, when the answer of step S5 is YES, the navigation system 30 acquires the vehicle traveling condition about the route for traveling to the destination (step S6), and outputs it to the ECU 50 on the vehicle side (step S7). The navigation system 30 causes the input screen for inputting the desired time to be displayed on the touch panel 31 (step S8), and determines whether the desired time is set (step S9). When the answer is NO, the process returns to step S9. When the answer is YES, the desired time is input to the ECU 50 on the vehicle side (step S10).

Subsequent to step S10, the ECU 50 on the vehicle side grasps the vehicle utilizing condition (step S11). Then, the ECU 50 on the vehicle side estimates the amount of charge in the battery 12 consumed during traveling under the vehicle traveling condition by referring to the operating condition set by the operating condition setting switch 40 and the vehicle traveling condition input from the navigation system 30, while taking the grasped vehicle utilizing condition into consideration (step S12). The ECU 50 on the vehicle side calculates the estimated time necessary for the power generating unit 11 to charge the battery 12 to make up the estimated amount of charge under the operating condition set by the operating condition setting switch 40 (step S13). The ECU 50 on the vehicle side determines whether the estimated time is longer than the desired time (step S14), and turns on the alarm lamp 46 if the answer is YES (step S15).

Subsequent to the negative determination in step S14 or to step S15, the ECU 50 on the vehicle side calculates the estimated amount of fuel (step S16), and causes the estimated amount of fuel to be displayed on the amount-of-fuel display part 67 (step S17). The ECU 50 on the vehicle side calculates the estimated travelable distance (step S18) and causes the estimated travelable distance to be displayed on the travelable distance display part 68 (step S19). In this calculation of the estimated travelable distance, the vehicle utilizing condition is considered.

The functions and effects of the electric drive vehicle 1 are now described. The electric drive vehicle 1 is equipped with the operating condition setting switch 50 with which the operating condition of the power generating unit 11 may be input in operation of the power generating unit 11. Thus, the electric drive vehicle 1 is capable of operating the power generating unit 11 on the basis of a user's intention such that priority should be given to the fuel economy or output.

The vehicle will be no longer able to run if the power generating unit 11 fails to complete generation of the necessary power within the time it takes for the vehicle to arrive at the destination, even in a case where power necessary for arriving at the destination can be ensured by generation of the power generating unit 11. However, the electric drive vehicle 1 is configured to turn on the alarm lamp 46 when the desired time that is set as the expected travel time for the destination is longer than the estimated time. Thus, it is possible to prevent the electric drive vehicle 1 from falling in inability to run due to shortage of charge before it happens in a situation in which the power generating unit 11 is operating under the specified operating condition and the electric drive vehicle 1 is traveling under the specified vehicle traveling condition. More specifically, the shortage of charge may occur in the case where the operating condition of the power generating unit 11 is the eco-charge mode. It is possible to cope with incomplete charging by switching the operating condition of the power generating unit 11 to the rapid-charge mode.

The electric drive vehicle 1 may have a supposed case where the power generating unit 11 originally fails to ensure power necessary for arriving at the destination.

However, the electric drive vehicle 1 is configured to display the estimated amount of fuel needed by the power generating unit 11 during traveling under the vehicle traveling condition on the amount-of-fuel display part 67. Thus, the electric drive vehicle 1 is favorable in that it is possible to know whether fuel is short by comparing the actual amount of remaining fuel with the estimated amount of fuel and to prevent the vehicle from falling in inability to run before it happens.

The estimated amount of fuel may be calculated by preliminarily grasping the operating condition of the power generating unit 11 and performance based on the operating condition. Thus, the electric drive vehicle 1 is favorable in that calculation and display of the estimated amount of fuel may be applied to a power generating unit that is not configured specifically to communicate with the ECU 50 on the vehicle side. In order to grasp the operating condition of the power generating unit that is not configured specifically to communicate with the ECU 50 on the vehicle side and performance based thereon, the electric drive vehicle 1 may be configured to have necessary information such as an engine displacement, used fuel, fuel on board, thermal efficiency and other factors.

The electric drive vehicle 1 is favorable in that the estimated travelable distance is displayed on the travelable distance display part 68 so that the vehicle can be prevented from falling in inability to run due to incomplete charging resulting from shortage of fuel before it happens.

The electric drive vehicle 1 is configured to take the vehicle utilizing condition into consideration in estimation of the amount of charge of the battery 12 consumed during traveling under the vehicle traveling condition, calculation of the estimated amount of fuel and calculation of the estimated travelable distance. Thus, the electric drive vehicle 1 is prevented from falling in inability to run due to incomplete charging resulting from shortage of fuel before it happens because estimation and calculation may be done more precisely.

The above-described embodiments are preferred embodiments of the present invention. The present invention is not limited to these embodiments, but may be carried out variously without departing from the scope of the present invention.

For example, in the above-described embodiment, the operating condition setting switch 40 is the intention setting means for setting the user's intention related to the operation of the power generating unit 11 as well as the operating condition setting means capable of setting the operating condition of the power generating unit 11.

However, the present invention is not limited to the above but the user's intention set by the intention setting means may be, for example, the desired time of charging by the power generating unit, the travel distance, or a request for operating the air conditioner (which may include temperature setting) besides the operating condition of the power generating unit. The operation means operates the power generating unit in accordance with the user's intention.

More particularly, when the user's intention is the desired time, the operation means may operate the power generating unit so as to charge the necessary amount of charge in the battery within the desired time (for example, a given amount of charge such as fully charging, or the amount of charge consumed during traveling under the vehicle traveling condition). In this case, more particularly, the operation means may operate the power generating unit under the operating condition in which priority is much more given to output as the desired time is shorter. This is favorable because the necessary charging can be completed within the user's desired time.

When the user's intention is the travel distance, the operation means may operate the power generating unit so as to charge the battery to make up an amount of charge consumed depending on the travel distance. In this case, more particularly, the operation means may operate the power generating unit under the operating condition in which priority is much more given to the fuel economy as the travel distance is longer. This is favorable in that the battery can be charged with economy in a case where the electric drive vehicle may further be equipped with stop means for stopping the operation of the power generating unit when the operation means completes charging.

When the user's intention is the travel route, the operation means may operate the power generating unit so as to charge the battery to make up an amount of charge consumed depending on the travel route. In this case, more particularly, the operation means may operate the power generating unit under the operating condition in which priority is much more given to the fuel economy as the travel distance is longer or the estimated amount of battery consumption is greater. This is favorable in that the battery can be charged with economy in a case where the electric drive vehicle may further be equipped with stop means for stopping the operation of the power generating unit when the operation means completes charging.

When the user's intention is the request for operating the air conditioner, the operation means may operate the power generating unit so as to charge the battery to make up power necessary to operate the air conditioner in accordance with the request. In this case, more particularly, the operation means may operate the power generating unit under the operating condition in which priority is much more given to output as the request for operation is set so as to have an increased load of the air conditioner. This is favorable in that the capacity of the battery can be prevented from being decreased due to the use of the air conditioner.

The operating condition setting means, which is the intention setting means also, may be not only means capable of directly setting the operating condition of the power generating unit but may be means capable of setting the operating condition of the power generating unit based on a predetermined setting.

The various means that are functionally realized by the navigation system 30, the ECU 50 on the vehicle side and the ECU 113 on the power generating unit side may be realized by, for example, other electronic control devices, hardware such as dedicated electronic circuits or combination thereof.

DESCRIPTION OF REFERENCE NUMERALS

1 electric drive vehicle
10 vehicle main body
11 power generating unit
111 engine
112 ECU on the power generating unit side
12 battery
30 navigation system
31 touch panel
40 operating condition setting switch
45 instrument panel
46 alarm lamp
47 amount-of-fuel display part
48 travelable distance display part
50 ECU on vehicle side

The invention claimed is:

1. An electric drive vehicle comprising:
a vehicle main body;
a battery mounted on the vehicle main body and usable for traveling; and
a power generating unit that charges to the battery, further comprising;
an operating condition setting part configured for a user of the electric drive vehicle to set an operating condition of the power generating unit to a first mode in which the power generating unit is operated with priority of fuel economy and a second mode in which the power generating unit is operated with priority of output;
an operation part configured to operate the power generating unit under the operating condition set by the operating condition setting part;
a vehicle traveling condition acquiring part configured to acquire a vehicle traveling condition about a route to a destination of the electric drive vehicle;
an estimation part configured to estimate, from the vehicle traveling condition, an amount of charge of the battery consumed in traveling under the vehicle traveling condition;
an estimated time calculating part configured to calculate an estimated time necessary for charging the battery to make up the amount of charge estimated by the estimation part under the traveling condition by the power generating unit;
a time setting part configured to set an expected time to the destination; and
a first notification control part configured to perform a control to notify a driver of an alarm when the estimated time necessary for charging the battery is longer than the expected time to the destination.

2. The electric drive vehicle according to claim 1, further comprising:
an estimated amount-of-fuel calculating part configured to calculate an estimated amount of fuel needed to travel under the vehicle traveling condition; and
a second notification control part configured to perform a control to notify the driver of the estimated amount of fuel.

3. The electric drive vehicle according to claim 1, further comprising:
a vehicle utilizing condition grasping part configured to grasp a vehicle utilizing condition;
a travelable distance calculating part configured to calculate a travelable distance taking the vehicle utilizing condition into consideration; and
a third notification control part configured to perform a control to notify the driver of the estimated travelable distance.

4. The electric drive vehicle according to claim 2, further comprising:
a vehicle utilizing condition grasping part configured to grasp a vehicle utilizing condition;
a travelable distance calculating part configured to calculate a travelable distance taking the vehicle utilizing condition into consideration; and
a third notification control part configured to perform a control to notify the driver of the estimated travelable distance.

* * * * *